UNITED STATES PATENT OFFICE.

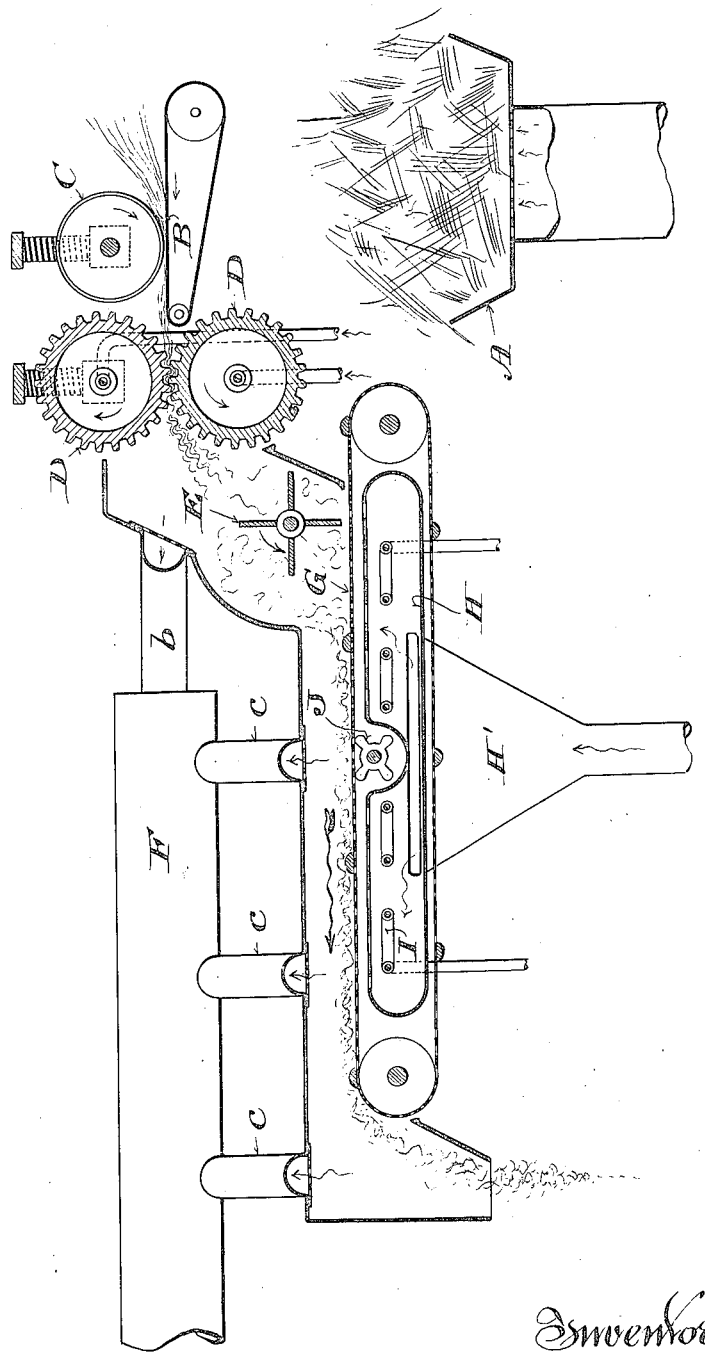

WILLIAM F. WYMAN, OF OSHKOSH, WISCONSIN, ASSIGNOR OF ONE-HALF TO JOSEPH A. CRUM, OF OSHKOSH, WISCONSIN.

METHOD OF TREATING GRASSES.

934,872.

Specification of Letters Patent. Patented Sept. 21, 1909.

Application filed December 31, 1908. Serial No. 470,229.

*To all whom it may concern:*

Be it known that I, WILLIAM F. WYMAN, a citizen of the United States, and resident of Oshkosh, in the county of Winnebago and State of Wisconsin, have invented certain new and useful Improvements in Methods of Treating Grasses; and I do hereby declare that the following is a full, clear, and exact description thereof.

My invention consists in what is hereinafter particularly described with reference to the accompanying drawings and pointed out in the claims of this specification, its object being the utilization of various grasses, especially coarse, tough marsh grasses, as a cheap elastic non-resinous and preferably deodorized packing and upholstery material having an approximately fireproof glaze and designed as an economical substitute for the now expensive excelsior to which it is preferable because of its non-inflammability under ordinary conditions or slow burning characteristic if ignited; as well as its lack of susceptibility to changes of atmospheric conditions and to the fact that it will not leave its imprint on varnished goods packed therewith.

The drawing is a diagram of an apparatus for carrying out my method of treating grasses.

Referring by letter to the drawing, A indicates a receptacle into which grass particularly coarse, tough marsh grass is preferably coated with salt or other suitable non-inflammable substance in any suitable manner, and also preferably subjected to fumes of sulfur and formaldehyde by which it is deodorized and sterilized. The material may be also treated with a coloring matter if desired, which coloring matter may be incorporated with the salt. The material is then spread between an endless traveling feed-apron B and a feed-roll C by which it is forced between a pair of heated and longitudinally corrugated rolls D, D in mesh with one another to effect a crimping operation. The crimping-rolls extract some moisture present in the material, and this moisture incorporates with the salt-coating to impart a dry glutinous fire-resisting glaze to said material; this glaze also serving to maintain the crimp. A rotatory beater E or other suitable means is preferably employed in an inclosed space to agitate the material coming from the crimping-rolls, and dust and chaff loosened by the agitation finds escape through a screened flue *b* into an air-exhaust drum F. Within the space aforesaid, an endless traveling screen-conveyer G is utilized to carry the crimped material over a box H having a perforated top and a blast-inlet H', a steam-coil I being employed in said box to heat the air that ascends through the conveyer and material to find its way through screened flues *c* to the air-exhaust drum. In order to further loosen dust and chaff from the crimped material, the screen-conveyer for the same is preferably agitated by a rotary knocker J or suitable means. The material is thoroughly dried on the conveyer and the dust and chaff occasioned by the agitation of said conveyer finds its way with the hot-air into the air-exhaust drum, said material being finally discharged from the aforesaid conveyer through a chute of the apparatus in a dry clean condition ready for use, the heating of the crimping-rolls and the drying air being regulated from time to time in accordance with the amount of moisture prevalent in the material under treatment.

The colored material will be found best suited to the upholstery trade as a stuffing for furniture seats and backs, while for packing material and mattress or pad filling the sulfur bleached material may be preferred.

I claim:

1. A method of treating grasses that consists in feeding the material between heated crimping rolls and subjecting the crimped material to a drying blast.

2. A method of treating grasses that consists in feeding the same between heated crimping-rolls, agitating the crimped material and subjecting the said material to a drying blast.

3. A method of treating grasses that consists in feeding the same between heated crimping-rolls and removing dust and chaff from the crimped material simultaneous with an exposure of said material to a drying blast.

4. A method of treating grasses that consists in coating the material with salt, feeding the salt-coated material between heated crimping-rolls, and drying the crimped material.

5. A method of treating grasses that consists in coating the material with salt, feeding the salt-coated material between heated crimping-rolls, and agitating the crimped material in a drying blast.

6. A method of treating grasses that consists in treating the material with fumes of sulfur, feeding the sulfurized material between heated crimping-rolls, and subjecting the crimped material to a drying blast.

7. A method of treating grasses that consists in salt-coating and sulfurizing the material, feeding the product between heated crimping-rolls, and subjecting the crimped material to a drying blast.

8. A method of treating grasses that consists in coloring the same, feeding the product between heated crimping-rolls, and subjecting the crimped material to a drying-blast.

9. A method of treating grasses that consists in salt-coating, sulfurizing and coloring the material, feeding the product between heated crimping-rolls, and subjecting the crimped material to a drying blast.

10. A method of treating grasses that consists in salt-coating, deodorizing and sterilizing the material, feeding the product between crimping-rolls, and subjecting the crimped material to a drying blast.

In testimony that I claim the foregoing I have hereunto set my hand at Oshkosh in the county of Winnebago and State of Wisconsin in the presence of two witnesses.

WILLIAM F. WYMAN.

Witnesses:
    CHAS. OELLERICH,
    OLIVE E. ARNOLD.